United States Patent [19]

Coughenour et al.

[11] 4,163,158

[45] Jul. 31, 1979

[54] SEWING MACHINE BOBBIN THREAD RUN-OUT ALARM USING REFLECTED LIGHT

[75] Inventors: Donald J. Coughenour, Morristown; Jack Brown, Union; John A. Herr, Garwood, all of N.J.

[73] Assignee: The Singer Company, New York, N.Y.

[21] Appl. No.: 900,026

[22] Filed: Apr. 25, 1978

[51] Int. Cl.² ............................................. G01N 21/30
[52] U.S. Cl. ........................................ 250/561; 242/36
[58] Field of Search ..................... 139/273 A; 28/187; 57/81; 250/560, 561, 231 R; 242/37, 36

[56] References Cited

U.S. PATENT DOCUMENTS

| | | | |
|---|---|---|---|
| 3,599,586 | 8/1971 | Newman | 242/36 |
| 3,631,901 | 1/1972 | Langenbach et al. | 139/273 A |
| 3,693,671 | 9/1972 | Desai | 139/273 A |
| 3,777,168 | 12/1973 | Sansone | 250/561 |
| 3,845,320 | 10/1974 | Winberg | 250/571 |

FOREIGN PATENT DOCUMENTS 2263327   3/1974   France.

OTHER PUBLICATIONS

Japanese Lay-Open Pub. No. 50-133044, Oct. 21, 1975 Taketomi.
Japanese Lay-Open Pub. No. 50-133047, Oct. 21, 1975 Taketomi.

Primary Examiner—David C. Nelms
Attorney, Agent, or Firm—Michael H. Wallach; Robert E. Smith; Edward L. Bell

[57] ABSTRACT

A mechanism for detecting the depletion of bobbin thread in a sewing machine. A bobbin is formed with a polygonal core having a plurality of light reflecting surfaces contained thereon. A light source transmits a beam of light toward the polygonal core of the bobbin and the light reflected therefrom is intercepted by a photodetector. The polygonal reflecting surfaces contained on the bobbin core do not begin to reflect light until a sufficient quantity of bobbin thread has been consumed in the sewing process to expose a part of the reflective surface portion of the bobbin core. The rotation of the bobbin thereafter results in flashes of light being received by the photodetector. An electronic circuit analyzes the output of the photodetector and distinguishes between the flashes and steady ambient light to signal the impending depletion of bobbin thread.

9 Claims, 5 Drawing Figures

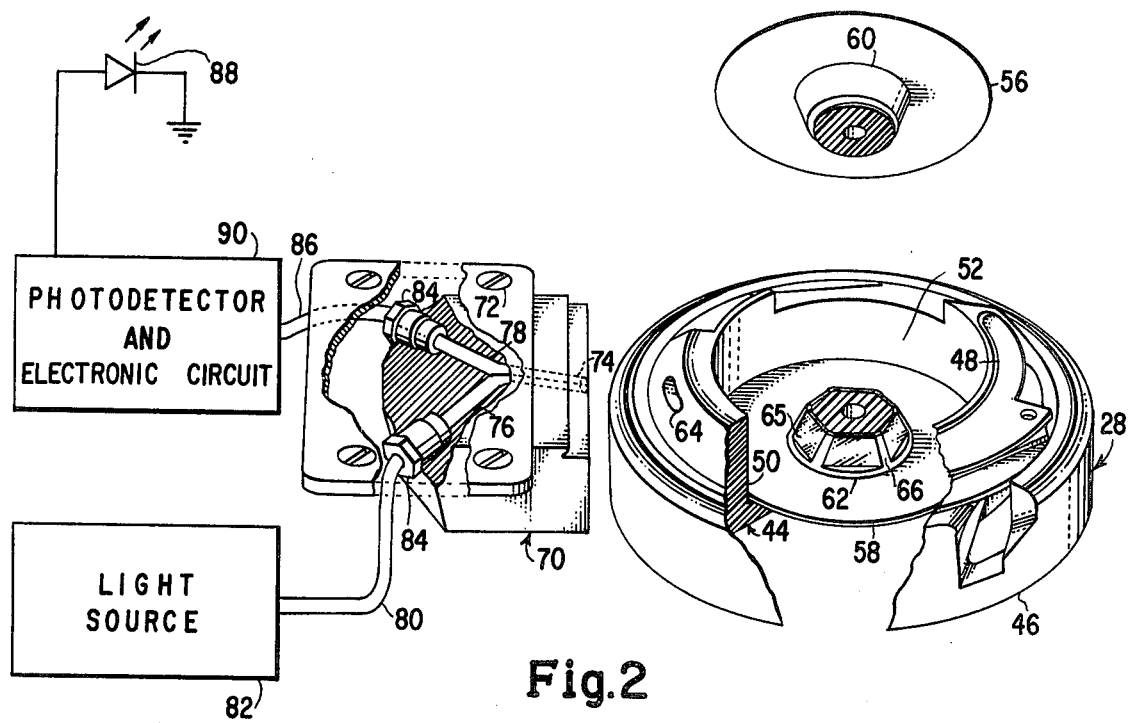
Fig.2
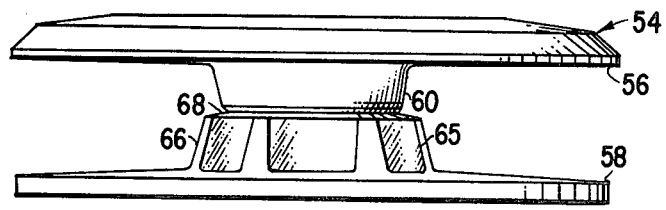
Fig.3
Fig.4
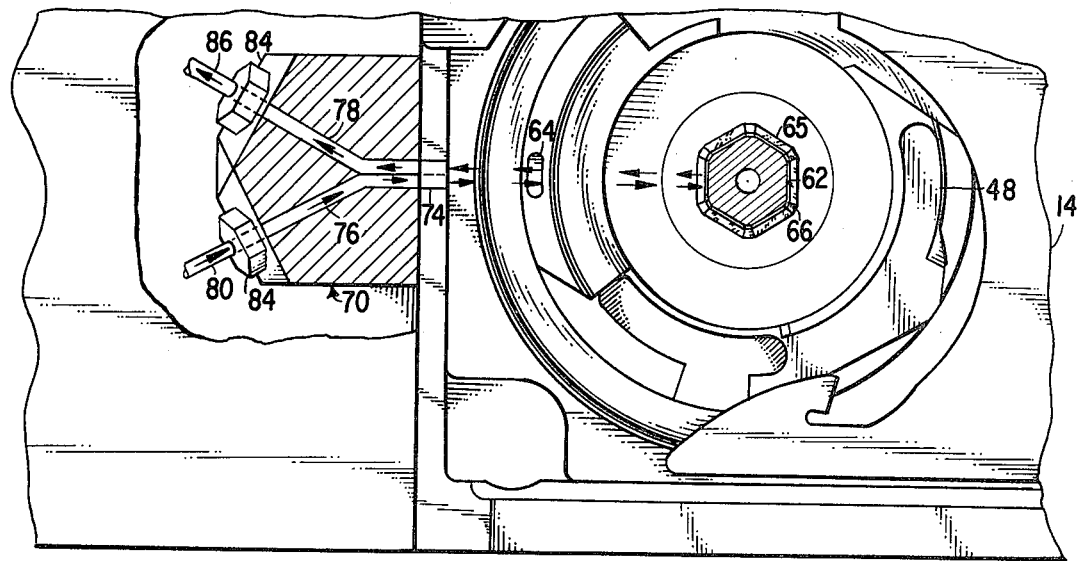

SEWING MACHINE BOBBIN THREAD RUN-OUT ALARM USING REFLECTED LIGHT

BACKGROUND OF THE INVENTION

1. Field of the Invention

This invention relates to sewing machines in general and more particularly to a photoelectric detecting system for detecting the depletion of bobbin thread.

2. Description of the Prior Art

The use of photoelectric detectors for detecting the exhaustion of bobbin thread is well known in the prior art. See for example U.S. Pat. No. 3,845,320 to Winberg, U.S. Pat. No. 2,350,397 to Haas, and U.S. Pat. No 3,631,901 to Langenbach. One problem associated with prior known bobbin thread run out detectors is that they are sensitive to stray light in the area occupied by the photodetector. Moreover, the prior art bobbin thread run out detectors are not suitable for detecting the rate at which bobbin thread is being consumed. Another problem of many prior art bobbin thread run out detectors is the need to locate the photodetector on the opposite side of the bobbin from the light source, thereby occupying much of already limited space in the vicinity of the hook mechanism. Still another problem with some prior art bobbin thread detectors is that the characteristics of light reflected from the bobbin to the photodetector do not change significantly as the thread supply is consumed, and therefore these prior detectors are overly sensitive and unreliable.

SUMMARY OF THE INVENTION

It is an object of this invention to provide a sewing machine bobbin thread run out detector which provides a positive indication of the impending exhaustion of bobbin thread.

It is another object of this invention to provide a sewing machine bobbin thread run out detector which may be employed to give an indication of the rate of depletion of bobbin thread.

Still another object of this invention is to provide a bobbin thread run out detector in which the light transmitter and receiver means may both be mounted on the same side of the bobbin case.

Another object of the invention is to provide a bobbin thread run out detector which is insensitive to stray light reflections in the area of the bobbin case.

The disclosed objects and other advantages of this invention are achieved by forming a portion of the core of a bobbin in the shape of a frustum of a polygone. The polygonal surfaces are provided with a light reflective treatment thereon for reflecting light therefrom. A light source is disposed below the slide plate of a sewing machine so that light from the source may be directed to the polygonal surfaces contained on the bobbin core. A photodetector means is positioned to receive light which is reflected from the polygonal surfaces. The light source and photodetector means are advantageously located so that they will not interfere with the operation of the hook drive or be in the path of the needle and needle thread when they enter the area of the hook. Thread which is wound about the bobbin core diffuses the light transmitted from the light source, thereby resulting in an insignificant quantity of light being reflected to the photodetector means. When the quantity of thread remaining on the bobbin reaches a predetermined minimum, a segment of the reflecting surfaces on the polygonal bobbin core is thereby exposed. The light transmitted by the light source is thereafter reflected from the polygonal reflecting surfaces toward the photodetector means. The removal of thread from the bobbin during the sewing process results in the rotation of the bobbin which causes the reflected light to be intermittently transmitted toward the photodetector means. The resulting electrical output produced by the photodetector means is thereby made dependent on rotation of the bobbin. The electrical output of the photodetector means is connected to an electronic circuit which removes from the signal any steady state component attributable to stray light which is not attributable to light reflected periodically from the bobbin core. The output of the circuit may thereafter be used to sense the depletion of the bobbin thread from the bobbin and the rate of bobbin thread depletion. A meter, lamp, speaker, or other indicating means may be employed to convey the information to the sewing machine operator.

BRIEF DESCRIPTION OF THE DRAWINGS

The above and other objects of this invention will be evident from an understanding of the preferred embodiment which is hereinafter set forth in such detail as to enable those skilled in the art to readily understand the function, operation, construction, and advantages of it when read in conjunction with the accompanying drawings in which:

FIG. 2 is a cutaway perspective view of a portion of the rotary hook mechanism of a sewing machine showing a bobbin constructed in accordance with the principles of this invention and also showing in schematic form the light source and the combined photodetector and electronic circuit means which cooperate to effectuate the objects of this invention;

FIG. 3 is a side view of the bobbin of this invention;

FIG. 4 is an overhead plan view partly in section of the bed of a sewing machine showing in diagrammatic form the optical path between the fiber optic light transmitting and receiving means and the reflecting surfaces contained on the bobbin.

DESCRIPTION OF THE PREFERRED EMBODIMENT

Figure 1:
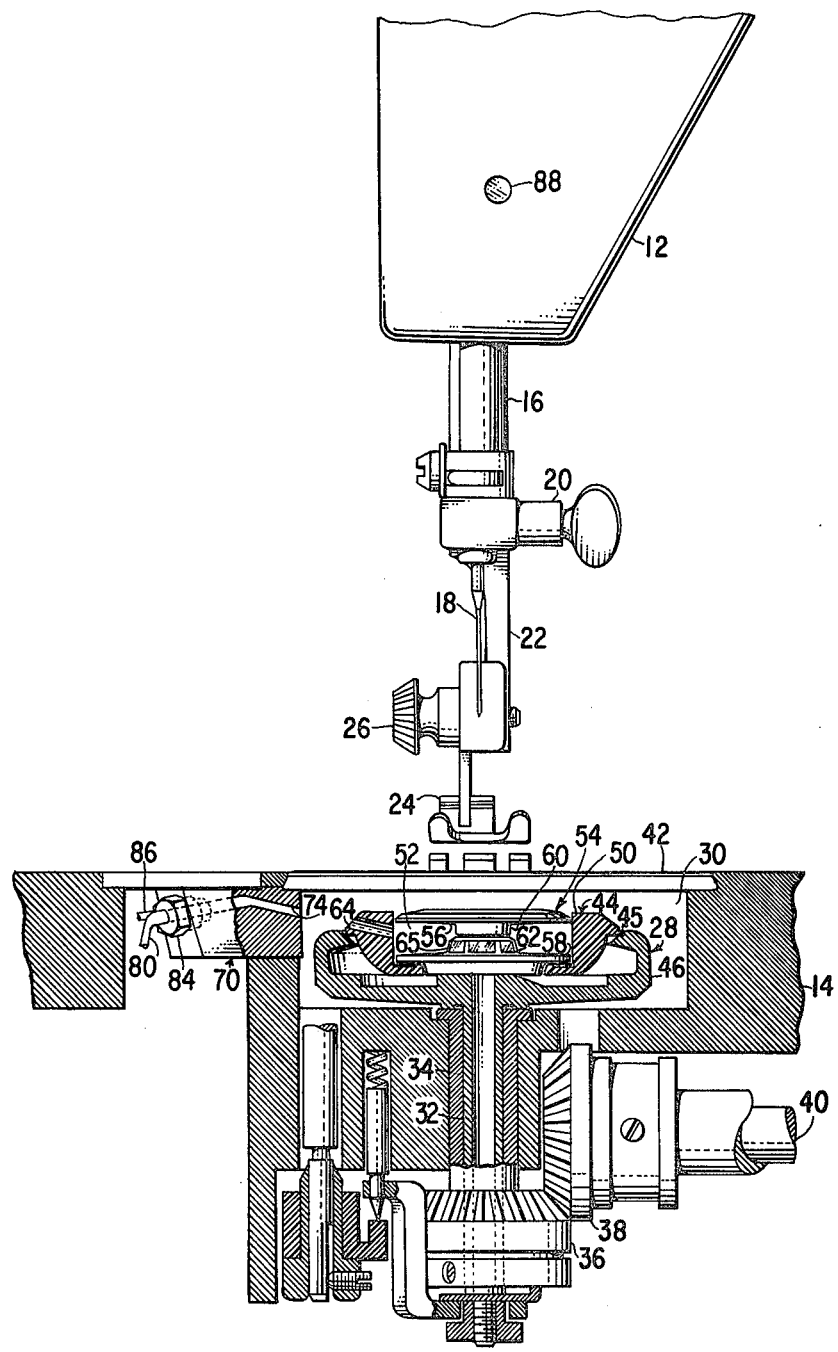
FIG. 1 is a perspective view partly in section of a portion of a sewing machine with the subject of the invention applied thereto.

Referring to the drawings, FIG. 1 shows the sewing head 12 of a conventional sewing machine overhanging the bed 14. Journalled in the sewing head 12 and adapted for endwise reciprocatory motion is a needle bar 16 which carries a needle 18 removably secured to the needle bar 16 with a needle clamp 20. Shown at 22 is a presser bar which is also journalled in the sewing head 12 and which has a presser foot 24 removably attached thereto by a presser foot clamp screw 26.

FIG. 1 also shows a cup-shaped rotary hook 28 which is contained in a cavity 30 formed in the sewing machine bed 14. The rotary hook 28 is supported within the cavity 30 by a hollow shaft 32 to which the rotary hook 28 is fixedly attached and which rotates within a bushing 34 journalled in the sewing machine bed. The hollow shaft 32 has a first bevel gear 36 attached thereto, for drivingly engaging a second bevel gear 38 which is attached to a bed shaft 40. A turning motion is imparted to the rotary hook 28 in timed relation to the reciprocation of the needle bar 16 by the rotation of the bed shaft 40. A slide plate 42, which is preferably adapted to be easily removed by the sewing machine operator for access to a bobbin case 44, overlies and encloses the top of the cavity 30.

The bobbin case 44 is supported within the rotary hook 28 by a race 45 formed on the top of a wall 46 of the rotary hook 28. FIG. 2 shows a support arm 48 which is rigidly attached to a wall 50 of the bobbin case 44. The support arm 48 is adapted in a conventional manner to restrain the bobbin case 44 from rotating with the rotary hook 28. See, for example, U.S. Pat. No. 3,693,565 of Sept. 26, 1972. The bobbin case 44 contains a cavity 52. A bobbin 54, which is preferably constructed in accordance with the teachings of this invention, may freely reside within the cavity 52. The bobbin 54 is free to rotate independently of the rotation of the rotary hook 28 and in response to the rate of formation of stitches. The bobbin 54 is adapted to carry and dispense a supply of bobbin thread which cooperates with the thread dispensed by the needle 18 to produce a lockstitch in a well known manner.

FIGS. 2 and 3 show the bobbin 54 having a circular upper flange 56 and a circular lower flange 58. The upper flange 56 has an upper bobbin core 60 formed in the shape of a frustum of a cone. The lower flange 58 contains a lower bobbin core 62 which is substantially formed in the shape of a frustum of a polygon and has a plurality of flat reflecting surfaces 65 formed thereon. The reflecting surfaces 65 are positioned so that they will reflect a beam of light which is aimed at them through an aperture 64 formed in the wall 50 of the bobbin case 44 along an adjacent path as that along which the light is transmitted toward the lower bobbin core 62. Non-reflecting surfaces 66 are preferably formed between each reflecting surface 65 of the bobbin core. The upper flange 56 of the bobbin 54 is attached to the lower flange 58 by cement or other attachment means applied to the contacting surfaces of the upper bobbin core 60 and the lower bobbin core 62. A slot 68 is formed between the lower bobbin core 62 and the upper bobbin core 60 to trap and restrain the first wrap of thread which is wound onto the bobbin 54.

An optical sensor carrier 70 is disposed in the bed 14 of the sewing machine and is fastened thereto with conventional fasteners such as the screws 72. The optical sensor carrier 70 is so positioned to have one side thereof form a segment of the side wall of the cavity 30 which contains the rotary hook 28. FIG. 4 shows that the optical sensor carrier 70 contains a bore 74 having a pair of intersecting bores 76 and 78 formed at one end thereof. The bore 74 is so aimed to permit a beam of light to travel from the optical sensor carrier toward the aperture 64 contained in the wall of the bobbin case. A fiber optic light transmitting means 80 may preferably be used for guiding light from a light source 82 to the optical sensor carrier 70. Preferably the fiber optic light transmitting means 80 may be bent so that the light source 82 may be remotely located from the area of the rotary hook 28. The fiber optic light transmitting means 80 is attached to the optical sensor carrier 70 by a fiber optic fastener 84. The fiber optic light transmitting means 80 is so disposed within the optical sensor carrier 70 that one end thereof terminates at the end of the bore 74.

The light source 82 which is illustrated on FIG. 2, provides the light for reflecting from the surfaces 65 on the bobbin 54, and may preferably be a conventional source of light such as an incandescent lamp.

An electronic circuit 90 containing a photodetector 92, shown generally in FIG. 2, is interconnected with the optical sensor carrier 70 by a fiber optic light receiving means 86 which has the same physical and light transmission properties as those of the fiber optic light transmitting means 80. A fiber optic fastener 84 is used to attach the light receiving means 86 to the optical sensor carrier 70. The end of the fiber optic light receiving means 86 which is attached to the optical sensor carrier 70 is so disposed within the bore 74 that the end thereof terminates at the common point of termination of the bore 74 and the fiber optic light transmitting means 80.

Figure 5:
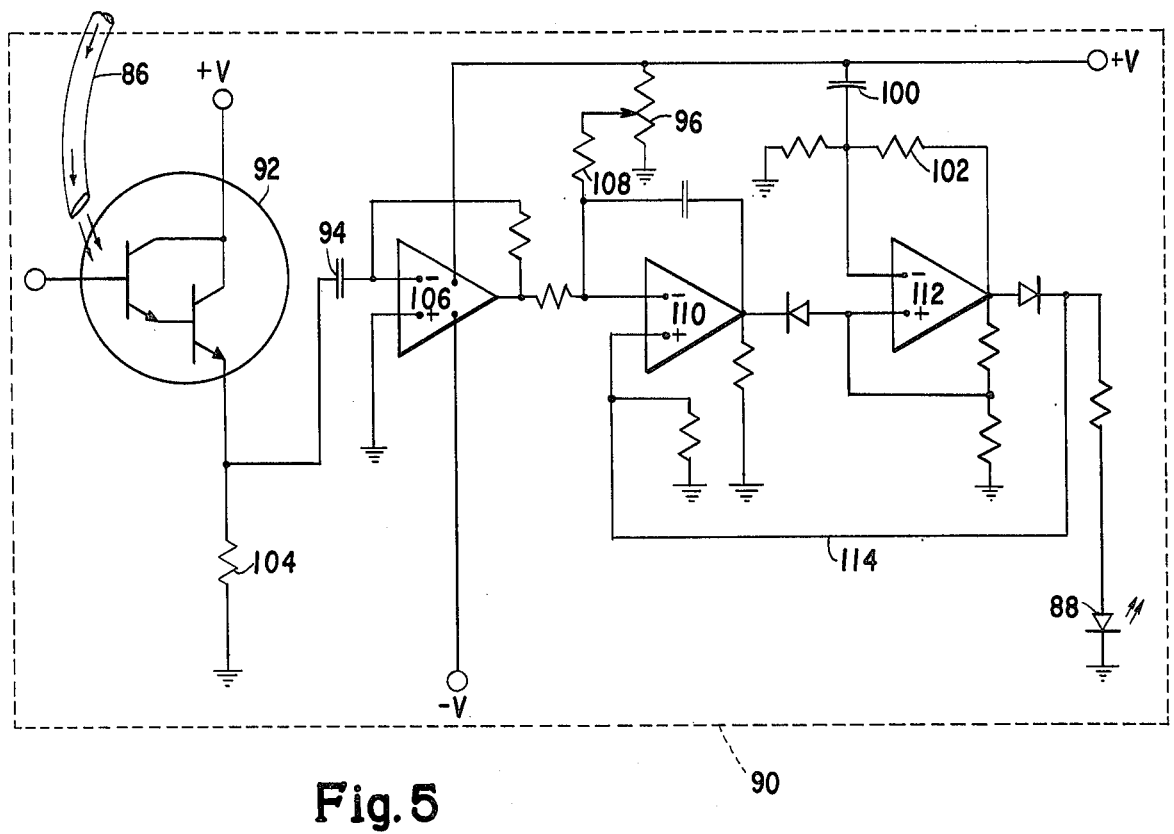
FIG. 5 is an electronic schematic diagram of a circuit which may be used to control the activation of the low bobbin thread signalling means.

The photodetector 92 is connected to the free end of the fiber optic light receiving means 86. The photodetector 92 is preferably an electrical device such as a phototransistor or a photodiode which is sensitive to the spectral characteristics of the light produced by the light source 82. A preferred embodiment of the photodetector 92 and electronic circuit 90 is more particularly shown in FIG. 5. The circuit shows a photodarlington transistor 92 which is positioned to receive the pulses of light reflected from the reflecting surfaces 65 through the fiber optic light receiving means 86. A capacitor 94 acts as an open circuit to signals generated by the photodarlington transistor 92 which are attributable to steady state illumination due either to stray light reaching the transistor 92 or from light reflected from the reflecting surfaces 65 when the bobbin 54 is not rotating. It will be appreciated that the frequency of light pulses impinging on the transistor 92 which will affect the circuit may be adjusted by varying the value of the capacitor 94, thereby allowing the bobbin thread run out detector to be made insensitive to fluctuations of lighting in the vicinity of the bobbin 54 which are not attributable to rotation of the bobbin 54. A variable potentiometer 96 may be used to adjust the sensitivity of the circuit to varying levels of light reaching the transistor 92.

A signalling means which may be used to warn an operator of the low bobbin thread condition is shown in the preferred embodiment as the light emitting diode 88. It is to be understood that any form of signalling means such as a meter or audible speaker may be employed to warn the operator of the imminent depletion of the bobbin thread. The electronic circuit 90 turns the light emitting diode 88 on once for a preset period of time for each pulse of light received by the transistor 92 from the reflecting surfaces 65 to insure that the operator is made aware of the depleted condition of the bobbin thread supply. A capacitor 100 and a resistor 102 are utilized to control the period of time that the light emitting diode 88 remains turned on. It is to be understood that a qualitative indication of the rate of depletion of bobbin thread may be obtained by observing the rate of flashing of the light emitting diode 88, since the interval of time between successive flashes of the diode 88 will decrease as the rate of consumption of bobbin thread increases.

The operation of the bobbin thread run out alarm using light reflected from the bobbin core will now be described. The first turn of thread which is placed on the bobbin 54 enters the slot 68 formed between the lower bobbin core 62 and the upper bobbin core 60 where it is restrained from free movement. The bobbin 54 may thereafter be rotated in a well known manner to cause thread to be removed from a supply spool and wound onto the bobbin 54 thereby filling the bobbin 54 with thread which will be consumed during the sewing process. The wrappings of the thread around the bobbin cores 60 and 62 results in the reflecting surfaces 65 being covered with thread thereby preventing light reflection therefrom. Light to illuminate the bobbin core is supplied by the light source 82 and is transmitted through the fiber optic light transmitting means 80 toward the lower bobbin core 62. The light passes through the aperture 64 in the wall 50 of the bobbin case 44 and, as a result of the angle of orientation of the axis of the bore 74, is directed toward the lower bobbin core 62. When there is sufficient bobbin thread remaining on the bobbin to cover the reflecting surfaces 65, the light transmitted toward the lower bobbin core 62 is substantially scattered by the bobbin thread. Not only is very little light reflected back toward the light receiving means 86 from the bobbin thread, but such reflected light will be of steady ambient nature. As the bobbin thread supply is depleted during the sewing process the bobbin 54 is caused to rotate. When a sufficient quantity of bobbin thread has been withdrawn such that the reflective surfaces 65 begin to be uncovered, light from the light source 82 impinges on the reflecting surfaces 65 contained on the lower bobbin core 62 and is intermittently reflected from the reflecting surfaces 65 toward the light receiving means 86. The rotation of the bobbin 54 during the sewing process causes the light reflected by the bobbin core 62 onto the light receiving means 86 to fluctuate in intensity from a high reflected quantity to a low reflected quantity in a pulsed manner due to the rapid change in alignment of the reflecting surfaces 65 with respect to the axis of the bore 74. The pulsed light passes through the aperture 64 and illuminates the end of the fiber optic light receiving means 86 positioned in the bore 78 of the optical sensor carrier 70. The pulsed light is thereafter transmitted by the fiber optic light receiving means 86 to the photodetector 92 coupled to the end thereof.

It is to be understood that the photodetector 92 will react to any light above a threshold value whether the light transmitted to it is of a constant or varying intensity. The function of the electronic circuit 90 shown in FIG. 5 in discriminating between light of a constant intensity and of a varying intensity impinging on the photodetector will now be described.

The photodarlington transistor 92 produces an output whose amplitude and frequency is proportional to the intensity and frequency of pulses of light impinging on it. The electronic circuit 90 rejects signals from the photodarlington transistor whose frequency is below that set by the combination of the capacitor 94 and a resistor 104. It will be appreciated that the capacitor 94 will also reject signals which do not have a time varying component, such as those produced by steady light impinging on the photodarlington transistor 92. An operational amplifier 106 inverts the pulses which are passed through the capacitor 94. The pulses are compared to a reference voltage developed across the potentiometer 96 and a resistor 108. The sensitivity of the circuit to varying levels of light impinging on the photodarlington transistor 92 may be adjusted by changing the resistance value of the potentiometer 96. An operational amplifier 110 may preferably be used to trigger an oscillator circuit when the output of the photodarlington transistor 92 exceeds the level set by the potentiometer 96 and the resistor 108. The oscillator circuit consists of an operational amplifier 112, the capacitor 100, and the resistor 102. The length of time that the light emitting diode 88 remains turned on is principally determined by the values of the capacitor 100 and the resistor 102. Since the rate at which the oscillator circuit is activated and therefore the rate at which the light emitting diode 88 flashes is dependent on the frequency of the pulses applied to the operational amplifier 110, it will be appreciated that the light emitting diode 88 will flash in response to the rate at which pulses are produced by the photodarlington transistor 92. The length of time that the light emitting diode 88 remains turned on is independent of the duration of the electrical pulses produced by the photodarlington transistor 92, but are dependent on the values of the capacitor 100 and the resistor 102 which are preferably chosen to insure that the light emitting diode 88 remains turned on for a sufficient length of time to insure that a sewing machine operator will become aware of the low bobbin thread condition. The length of time for which the light emitting diode 88 remains turned on is therefore made independent of the sewing rate. Since, however, the interval between successive flashes of the light emitting diode 88 is dependent on the rate at which pulses are produced by the photodarlington transistor 92, the operator will become aware of the rate of consumption of bobbin thread by observing the rate at which the light emitting diode 88 is turned on.

The operational amplifier 110 is connected to the operational amplifier 112 by a feedback loop 114 which prevents the oscillator from being triggered before it has finished a complete cycle of turning the light emitting diode on and off for a fixed period of time. It will therefore be apparent that the light emitting diode 88 cannot be turned on at a rate faster than its rate of flashing which is set by the oscillator, which is independent of the rate at which pulses are developed by the operational amplifier 110, and therefore, once the photodarlington transistor 92 begins to produce pulses at a rate faster than the rate set by the oscillator, the light emitting diode 88 will flash on and off at a fixed rate which is independent of the rate of rotation of the bobbin 54.

It will therefore be appreciated that the electronic circuit 90 senses the pulsed characteristic format of the output of the photodetector 92 and operates the signalling means 88 to warn the operator of the impending exhaustion of the bobbin thread supply. In view of the fact that the electronic circuit 90 will ignore a steady state condition resulting from either a steady reflection of light or a complete absense of light being transmitted to the photodetector 92, the signalling means 88 will not be operated when the bobbin 54 has been depleted of thread and is therefore no longer rotating. The signalling means 88 therefore will only flash while there remains an opportunity for the machine operator to take corrective action.

Modifications and variations of the above described preferred embodiment will become evident to one skilled in the art in light of the above teachings. It is to be understood that variations may be made to the preferred embodiment without departing from the spirit and scope of the invention as defined in the appended claims.

Having thus set forth the nature of the invention, what is claimed herein is:

1. An apparatus for indicating the approaching end of a bobbin thread supply for a sewing machine comprising a bobbin having a core with a plurality of reflecting surfaces formed thereon, a light source for illuminating the reflecting surfaces on said bobbin core, a photodetector means for sensing light reflected from said reflecting surfaces, an electronic circuit for distinguishing between flashing light reflected from said bobbin core and ambient light, and signalling means controlled by said electronic circuit for advising a sewing machine operator when depletion of said bobbin thread exposes said reflecting surfaces on said bobbin core and causes light reflected from said bobbin core to flash.

2. An apparatus for indicating the approaching end of a bobbin thread supply wound on a bobbin in a sewing machine as claimed in claim 1 wherein said bobbin core has an upper portion having the shape of a frustum of a cone, and a lower portion formed in the shape of a frustum of a polygon, said lower portion of said core containing a plurality of plane reflecting surfaces formed on the faces of said frustum of the polygon.

3. An apparatus for indicating the approaching end of a bobbin thread supply as claimed in claim 1 wherein said photodetector means is a photodarlington transistor.

4. An apparatus for indicating the approaching end of a bobbin thread supply as claimed in claim 1 wherein said electronic circuit includes a filter which rejects steady state signals produced by said photodetector means and passes time varying signals.

5. An apparatus for indicating the approaching end of a bobbin thread supply as claimed in claim 1 wherein said light source and said photodetector means are remotely located from said bobbin, said light source and said photodetector means having a light transmitting means and a light receiving means to communicate light between said bobbin and said light source and said photodetector means.

6. An apparatus for indicating the approaching end of a bobbin thread supply as claimed in claim 5 wherein said light transmitting and receiving means are fiber optic light guides.

7. An apparatus for indicating the approaching end of a bobbin thread supply as claimed in claim 1 wherein said light transmitting means and said light receiving means are attached to an optical sensor carrier, said optical sensor carrier having a first bore for receiving said light transmitting means, a second bore intersecting one end of said first bore for receiving said light receiving means, and a third bore having one end thereof intersecting the common intersection of said first bore and said second bore, said third bore being adapted to guide light from the intersection of said first and said second bores toward an aperture formed in said bobbin case, said aperture permitting an optical path to be formed between the axis of said third bore and said reflective surfaces of said lower bobbin core, whereby light transmitted from said light source passes through said first bore and said third bore and said aperture in said bobbin case and is reflected from said reflective surfaces contained on said lower bobbin core through said aperture and said third and said second bores toward said light receiving means disposed in said second bore.

8. An apparatus for indicating the approaching end of a bobbin thread supply as claimed in claim 1 wherein said electronic circuit turns on said signalling means in response to the rate of depletion of said bobbin thread supply.

9. An apparatus for indicating the approaching end of a bobbin thread supply as claimed in claim 1 wherein said electronic circuit turns on said signalling means for a fixed period of time in response to the rate of reception of flashes of light by said photodetector means, said fixed period of time being independent of the duration of the flashes of light received from said bobbin core.

* * * * *